T. H. SCHOEPF.
ELECTRICALLY PROPELLED VEHICLE.
APPLICATION FILED MAY 3, 1915.
1,250,231.
Patented Dec. 18, 1917.
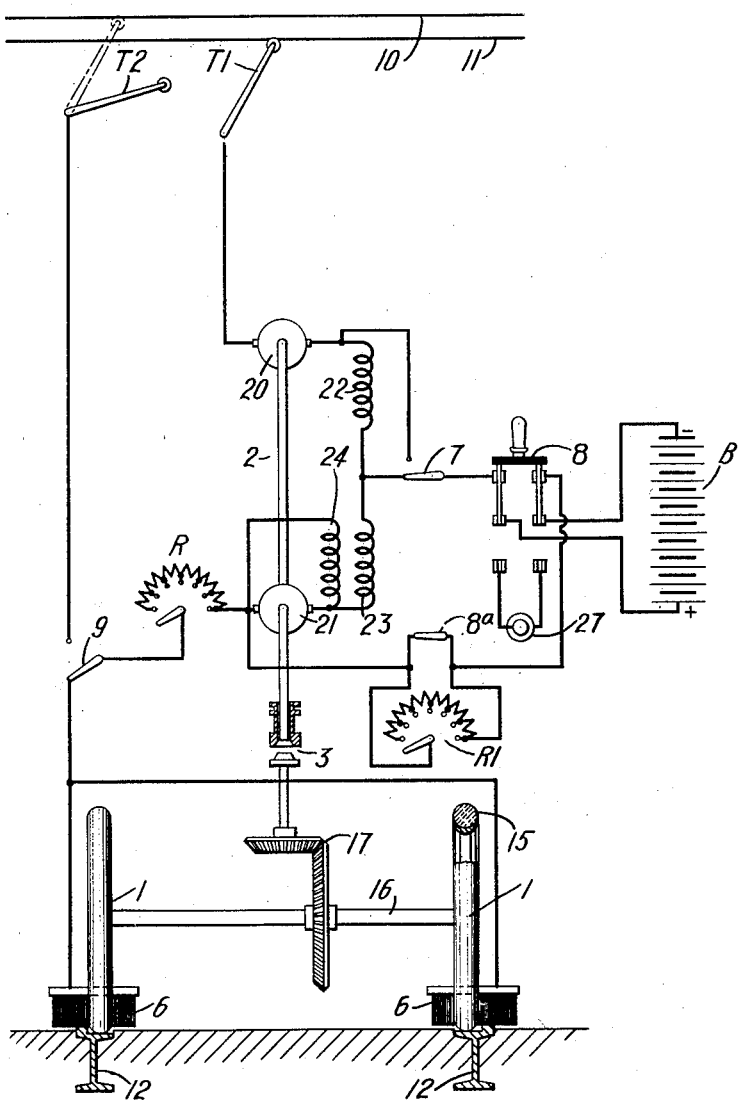
WITNESSES:
Fred A. Lind.
INVENTOR
Theodore H. Schoepf
BY
ATTORNEY

UNITED STATES PATENT OFFICE.

THEODORE H. SCHOEPF, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICALLY-PROPELLED VEHICLE.

1,250,231.  Specification of Letters Patent.  Patented Dec. 18, 1917.

Application filed May 3, 1915. Serial No. 25,576.

*To all whom it may concern:*

Be it known that I, THEODORE H. SCHOEPF, a citizen of the United States, and a resident of Pittsburgh, in the county of Allegheny and State of Pennsylvania, have invented a new and useful Improvement in Electrically-Propelled Vehicles, of which the following is a specification.

My invention relates to electrically propelled vehicles, and it has special reference to vehicles that are adapted for operation from either a storage battery carried thereby or from an external source of energy, such as a trolley conductor.

One of the objects of my invention is to provide a vehicle of the above indicated character that shall be simple in arrangement of circuit connections and mode of operation and which shall embody a so-called dynamotor as its driving unit, by means of which the vehicle may be operated from either a high-voltage external source of energy or from a relatively low-voltage storage battery which is carried by the vehicle.

Another object of my invention is to provide a system of control for an electrically-propelled vehicle adapted to be supplied with energy from either a trolley or a storage battery, which shall include means for charging the battery either when the vehicle is in operation or when it is at rest and its driving unit is running.

More specifically, it is an object of my invention to provide an electrically propelled vehicle of the so-called "trackless-trolley" type which is usually provided with rubber tired wheels and is adapted to be independent of tracks, and to provide means whereby the usual grounded trolley system of an ordinary electric railway system may be employed for supplying energy thereto, suitable traveling electrical contacts being made with the trolley conductor and the track for the purpose of collecting and returning energy from and to the source of supply.

Electrically propelled vehicles of the trackless-trolley type usually take the general form of the well-known rubber tired automobile busses and receive their energy from a pair of trolley conductors that are suitably suspended over the street or roadway upon which they are operated. It is evident, therefore, that such vehicles are confined to those localities which are provided with the necessary trolley conductors and, hence, are restricted in their field of operation in the same manner as electric railway cars that are dependent both upon trolley conductors and track rails.

According to my present invention, I propose to overcome the limitations in the operation of such vehicles that have heretofore been encountered, and to provide a vehicle of this general type which, by reason of the construction and electrical characteristics of its driving unit and its system of control, shall be adapted to be operated entirely independently of the trolley conductors for limited periods of time and which, moreover, may be operated from the usual single trolley conductor of an electric railway system, suitable means being provided for effecting a traveling electrical contact with the return track circuit or rails.

With such a system, the vehicle may be normally operated upon well defined routes that are provided with the necessary supply conductors in the same general manner as the ordinary electric railway system, while its operation is not confined necessarily to these routes, as the vehicle may also be operated from its own source of energy wherever desired.

For illustrative purposes, I shall set forth my invention in connection with a vehicle of the trackless-trolley type, but it should be understood that my invention is not in any sense so restricted, but is equally applicable to various other classes of electrically propelled vehicles and conditions of service, such, for instance, as mining locomotives or the like.

The single figure of the accompanying drawing is a diagrammatic view of an electrically propelled vehicle and system of control therefor embodying my invention.

Referring to the drawing, the vehicle shown comprises a plurality of driving wheels 1, a dynamo-electric machine 2, a driving clutch 3, a storage battery B, a plurality of current-collecting trolleys $T_1$ and $T_2$, a plurality of current-collecting shoes or brushes 6, a plurality of switching devices 7, 8 and $8^a$ for governing the circuit connections of the driving unit or dynamo-electric machine 2 and the storage battery B, a switching device 9 for arranging the circuit connections of the driving unit for operation either from a supply circuit comprising a plurality of trolley conductors 10 and 11 or from a supply circuit comprising a trolley conductor 11 and a return circuit comprising track rails 12, and a plurality of starting resistors R and R¹ for respectively governing the acceleration of the driving unit when connected to the high-voltage external source of energy or the storage battery.

If the vehicle takes the form of the usual trackless trolley, the driving wheels 1 are provided with suitable tires 15 of rubber or other resilient and, incidentally, insulating material, although, in the case of mining locomotives or certain other classes of vehicles, the wheels 1 need not necessarily be so tired but may be of the usual steel construction such as are commonly employed upon electric railway cars and locomotives that are adapted for operation upon tracks.

Inasmuch as my invention is intended particularly for trackless-trolley vehicles, it is deemed best to hereinafter set forth my invention in that connection.

The driving wheels 1 are associated with an axle 16 in the ordinary manner which should preferably include a differential (not shown) of suitable form, and the driving effort of the dynamo-electric machine 2 is transmitted to the driving axle 16 through the clutch 3 and suitable gearing 17, the clutch being operated and controlled in any well-known manner.

The dynamo-electric machine or driving unit 2 constitutes a dynamotor, such as is familiar to those skilled in the art and is set forth in Patent No. 1,079,401, granted to the Westinghouse Electric & Mfg. Company as assignee of William Cooper, and comprises a single machine embodying a plurality of separate sets of armature conductors (not shown) that are disposed upon a single core member and are independently electrically associated with a plurality of commutator cylinders 20 and 21, a plurality of series field magnet windings 22 and 23 and a shunt field magnet winding 24.

For the sake of simplicity and clearness, the commutator cylinders 20 and 21 will be hereinafter referred to as armature windings 20 and 21, it being understood, of course, that suitable armature windings are connected thereto.

The armature windings 20 and field magnet winding 22 comprise the motor unit of the dynamotor 2, while the armature windings 21 and field magnet windings 23 and 24 constitute the generator unit thereof, and, in order to adapt the machine 2 for the class of service under consideration in which the two available sources of energy are of relatively different voltages, the unit first referred to, is designed for relatively high voltage, while the latter unit is adapted for the relatively low voltage of the battery B. The armature windings 20, field magnet windings 22 and 23 and the armature windings 21 are connected in series-circuit relation, while the field magnet winding 24 is connected in shunt across the armature 21 and serves to prevent excessive speed under conditions of light or no load, as will be understood.

The current-collecting trolleys $T_1$ and $T_2$, and the switching devices 7, 8, 8ª and 9 may be of any suitable construction for performing their respective functions, while the current-collecting devices 6 preferably constitute brushes of current-carrying material that may be adjusted in position to make electrical engagement with the track rails 12, although other forms of collecting devices may be employed.

Assuming the vehicle to be operated from a supply circuit comprising a single trolley conductor 11 and the track return circuit 12 and that the circuit connections and apparatus are as shown in the drawing, the operation of the vehicle is as follows:

In order to operate the dynamotor or driving unit 2, the starting resistor R is gradually excluded from circuit, during which operation, energy is supplied from the trolley conductor 11 through trolley $T_1$, armature winding 20, series field windings 22 and 23, armature winding 21, resistor R, switch 9, in its lower position, and, thence, in parallel, through devices 6 to the rails 12. Inasmuch as the high-voltage unit of the dynamotor 2 is connected in series circuit with the unit of low voltage, the dynamotor, as a whole, is adapted for operation upon the high-voltage external source of energy, or trolley system.

With the switches 7, 8, 8ª and 9 in the positions shown, the battery B is connected across the armature 21, including the shunt winding 24, and field magnet winding 23 of the low-voltage unit of the dynamotor 2, and, when said dynamotor is in operation, a charging current is caused to traverse the storage battery.

If it is desired to propel the vehicle, the clutch 3 is actuated to effect a driving connection between the dynamotor 2 and the gearing 17 before the starting resistor R is excluded from circuit, and the dynamotor is then brought up to speed. Having thrown in the clutch 3, the dynamotor 2 may be operated and the speed of the vehicle controlled by suitable adjustments of the starting resistor R. The battery B, being connected across the low-voltage unit of the dynamotor 2, receives a charging current throughout the operation and, hence, is maintained in condition for supplying energy to the dynamotor and operating the vehicle in the event that it is desired to operate independently of the trolley conductor 11 and track 12.

During the operation of the vehicle from the trolley conductor 11, the contact brushes 6 serve to make a traveling electrical engagement with the track rails 12 for returning the energy to the source, and, inasmuch as the brushes 6 are of considerable width, it is unnecessary that the vehicle be run upon rails 12 at all times, a certain amount of latitude being permitted.

For purposes of explanation, it will now be assumed that it is desired to operate the vehicle upon a street or section that is not provided with trolley conductors and tracks. The trolley $T_1$, therefore, is lowered, switch $8^a$ opened, the collecting brushes 6 raised, and the dynamotor 2 is supplied with energy from the storage battery B, the battery being connected across the low-voltage unit of the machine, as hereinbefore set forth. In this way, the vehicle may be operated without restrictions as to its route in the same manner as any ordinary storage-battery automobile or other similar vehicle, resistor $R^1$ being employed for governing the operation thereof.

For the purpose of limiting the speeds when operating on light load, or for securing a low speed when operating at normal or overloads, the switch 7 may be raised into its upper position, whereby the series field winding 22 is also included in the circuit which is supplied by the battery B.

If it becomes desirable to charge the storage battery from a battery-charging station or other source of energy, the switch 8 is thrown to its lower position, whereby the battery is connected to a charging plug 27 which may be electrically associated with the external source of charging current in the usual manner.

If two trolley conductors 10 and 11 are provided, as is the case with the usual vehicle of the trackless trolley type, both current-collecting trolleys $T_1$ and $T_2$ are employed, and the switch 9 is caused to occupy its upper position. The operation of the vehicle thereafter is similar to that hereinbefore set forth, the resistor R being used, the only difference being that the return circuit now constitutes the trolley conductor 10 in lieu of the track rails 12.

Obviously, variations in the circuit connections and arrangement and location of parts may be effected without departing from the spirit and scope of my invention, and the advantages and benefits thereof may be secured by vehicles embodying control systems and apparatus differing widely from that shown and described but which embody the same general principles. I desire, therefore, that only such limitations shall be imposed as are indicated in the appended claims.

I claim as my invention:

1. In an electrically propelled vehicle having driving wheels, the combination with an external source of energy, a storage battery mounted on the vehicle and a dynamotor having series-connected half-units for propelling the vehicle, of means comprising a shunt field winding connected to one of said half-units and a clutch for disconnecting the dynamotor from the driving wheels, whereby the battery may be charged from the external source of energy when the vehicle is at rest.

2. In an electrically propelled vehicle, the combination with an external source of energy, a storage battery mounted on the vehicle and a dynamotor having series-connected half-units for propelling the vehicle, of means for connecting the battery in shunt to various portions of said dynamotor half-units to charge the same from the external source of energy when the vehicle is at rest.

3. In an electrically propelled vehicle having driving wheels, the combination with an external source of energy, a storage battery mounted on the vehicle and a dynamotor having series-connected half-units for propelling said vehicle, one of said half-units comprising an armature winding and a shunt and a series field winding, of means for connecting the battery around one of said half-units to charge the battery from the external source of energy and to operate the dynamotor when disconnected from the external source of energy and a clutch for disconnecting said dynamotor from the driving wheels to permit the charging of the battery from the external source of energy when the vehicle is at rest.

4. In an electrically propelled vehicle adapted to be operated from an external source of energy, the combination with a storage battery of relatively low voltage and a dynamotor for propelling said vehicle comprising series-connected half units adapted for relatively different voltages, of means for connecting the external source of energy to the series-connected half units of the dynamotor or for connecting the battery across one of the dynamotor half units to propel the vehicle, and means, with the battery connected across one of the dynamotor half-units, for charging the battery when the vehicle is being propelled and when the same is at rest.

5. In an electrically propelled vehicle adapted to be operated from a high-voltage external source, the combination with driving wheels and a dynamotor comprising series-connected half units and a clutch between said dynamotor and said driving wheels, of a storage battery and means for supplying relatively high-voltage energy to said series-connected half units and for connecting said storage battery across one of said units, whereby the dynamotor is operated from the external source and the battery is charged, irrespective of the position of said clutch.

6. In an electrically propelled vehicle, the combination with an external source of energy, a storage battery mounted on the vehicle and a dynamotor having a plurality of armature and field windings for propelling the vehicle, of means for connecting said battery in parallel with various combinations of said dynamotor windings to the external source of energy, whereby the battery may be charged at various voltages.

7. In an electrically propelled vehicle, an external source of energy, a storage battery mounted on the vehicle and a dynamotor comprising series-connected half-units for propelling the vehicle and adapted to be energized either from the external source of energy or from the storage battery, one of said half-units being provided with a shunt field winding, whereby the dynamotor may be relieved of the load thereon without obtaining an excessive speed.

8. In an electrically propelled vehicle having driving wheels, the combination with an external source of energy, a storage battery mounted on said vehicle, a dynamotor comprising series-wound half-units for propelling the vehicle, circuit connections for energizing said dynamotor from the external source of energy and from the battery and a clutch for connecting the dynamotor to the driving wheels, of a shunt field winding connected to one of said half-units for preventing the dynamotor obtaining an excessive speed when the clutch is released and the dynamotor is relieved of the load thereon.

9. In an electrically propelled vehicle having driving wheels, the combination with an external source of energy, a storage battery carried by the vehicle and a dynamotor adapted to be energized either by the external source of energy or by the storage battery, of a clutch for connecting the driving effort of the dynamotor to the driving wheels, and means for preventing an excessive speed of the dynamotor when the clutch is released.

10. In an electrically propelled vehicle, the combination with an external source of energy, a storage battery carried by the vehicle and a dynamotor comprising series-connected half-units adapted for relatively different voltages, of means for connecting said battery around various portions of said half-units to charge the same from the external source of energy at various voltages.

In testimony whereof, I have hereunto subscribed my name this 29th day of Apr., 1915.

T. H. SCHOEPF.